US012719280B2

(12) United States Patent
Xu et al.

(10) Patent No.: US 12,719,280 B2
(45) Date of Patent: Aug. 25, 2026

(54) METHOD AND DEVICE FOR CONTROLLING MICROGRID OF HYDROMETALLURGICAL PLANT BASED ON ENERGY STORAGE FREQUENCY CONVERTER

(71) Applicant: Tianjin University, Tianjin (CN)

(72) Inventors: Xiandong Xu, Tianjin (CN); Yuze Zhao, Tianjin (CN); Longfei Liu, Tianjin (CN); Jing Liu, Tianjin (CN); Manjun Chen, Tianjin (CN); Wei Wei, Tianjin (CN); Hongjie Jia, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 19/207,798

(22) Filed: May 14, 2025

(65) Prior Publication Data

US 2025/0273962 A1 Aug. 28, 2025

(30) Foreign Application Priority Data

Aug. 19, 2024 (CN) ......................... 202411138656.X

(51) Int. Cl.

| | |
|---|---|
| ***H02J 3/28*** | (2026.01) |
| ***H02J 3/0014*** | (2026.01) |
| ***H02J 3/14*** | (2026.01) |
| ***H02J 3/38*** | (2026.01) |
| ***H02P 27/06*** | (2006.01) |

(52) U.S. Cl.

CPC ............ *H02J 3/28* (2013.01); *H02J 3/00142* (2026.01); *H02J 3/14* (2013.01); *H02J 3/38* (2013.01); *H02P 27/06* (2013.01)

(58) Field of Classification Search

CPC .. H02J 3/28; H02J 3/00142; H02J 3/14; H02J 3/38; H02J 2101/24; H02J 2105/10; H02J 3/32; H02J 3/381; H02J 3/46; H02J 9/062; H02J 15/00; H02P 27/06

See application file for complete search history.

(56) References Cited

U.S. PATENT DOCUMENTS

| | | | | |
|---|---|---|---|---|
| 9,673,628 | B2 * | 6/2017 | Majumder ................ | H02J 3/32 |
| 10,020,656 | B2 * | 7/2018 | Saussele ................... | H02J 3/38 |
| 2015/0256025 | A1 * | 9/2015 | Brhlik ....................... | H02J 7/34 307/21 |
| 2017/0040800 | A1 * | 2/2017 | Majumder ................ | H02J 3/26 |
| 2019/0044335 | A1 * | 2/2019 | Soverns .................... | H02J 3/18 |

(Continued)

*Primary Examiner* — Menatoallah Youssef
*Assistant Examiner* — Michael J Warmflash

(57) ABSTRACT

A method for controlling a microgrid of a hydrometallurgical plant based on an energy storage frequency converter includes: controlling the opening and closing of a first circuit breaker and a second circuit breaker based on frequency change data of an AC bus in a plant microgrid. The energy storage frequency converter includes an energy storage unit, a first AC-DC converter, and an inverter. An input end of the first AC-DC converter is connected to an external power grid through an AC bus, and a first circuit breaker is provided between the first AC-DC converter and the external power grid. An input end of the inverter is connected to an output end of the first AC-DC converter, and an output end is connected to a variable frequency motor. The energy storage unit is connected between the output end of the first AC-DC converter.

9 Claims, 4 Drawing Sheets

(56) References Cited

U.S. PATENT DOCUMENTS

| | | | | |
|---|---|---|---|---|
| 2019/0140453 | A1* | 5/2019 | Yi | H02J 3/003 |
| 2019/0157876 | A1* | 5/2019 | Dobrowolski | H02J 3/48 |
| 2020/0195011 | A1* | 6/2020 | De Callafon | H02J 3/32 |
| 2020/0235578 | A1* | 7/2020 | Majumder | H02J 3/28 |
| 2022/0214399 | A1 | 7/2022 | Liaw et al. | |
| 2022/0285977 | A1* | 9/2022 | Pmsvvsv | H02J 9/061 |
| 2023/0198260 | A1* | 6/2023 | Leitner | H02J 3/28 700/291 |
| 2025/0149892 | A1* | 5/2025 | Scobie | H02J 3/28 |
| 2025/0273957 | A1* | 8/2025 | Xu | H02J 3/001 |

* cited by examiner

METHOD AND DEVICE FOR CONTROLLING MICROGRID OF HYDROMETALLURGICAL PLANT BASED ON ENERGY STORAGE FREQUENCY CONVERTER

CROSS-REFERENCE TO RELATED APPLICATIONS

This application claims priority to Chinese Patent Application No. 202411138656.X with a filing date of Aug. 19, 2024. The content of the aforementioned application, including any intervening amendments thereto, is incorporated herein by reference.

TECHNICAL FIELD

The present disclosure relates to the field of microgrids, and in particular, to a method and device for controlling a microgrid of a hydrometallurgical plant based on an energy storage frequency converter.

BACKGROUND

If the power grid in the plant area is unsatisfactory in reliability, such as frequent power cuts, fault shocks and frequency fluctuations, resulting in power outages of the plant, it will have a great impact on large frequency conversion equipment in the plant. For example, large rotary power equipment such as a ball mill in the hydrometallurgical plant needs to go through a long soft start after a power failure to restart. During this period, the equipment needs to go through a plurality of steps such as machine turning, variable frequency motor input, equipment rotation acceleration, and putting into production with load. In this process, the operating state of the equipment during a startup phase needs to be continuously monitored and adjusted. In addition, such large equipment has a large inertia during the startup process, and requires relatively high energy consumption for startup. In short, unsatisfactory reliability of a regional power grid will seriously affect the production and operation of frequency conversion equipment in the plant.

SUMMARY

The present disclosure provides a method and device for controlling a microgrid of a hydrometallurgical plant applicable to and based on an energy storage frequency converter, so as to solve the problem in the prior art that unsatisfactory reliability of a regional power grid seriously affects the production and operation of frequency conversion equipment in the plant, thereby achieving the effect of improving the stability of production and operation of the frequency conversion equipment in the plant.

The present disclosure provides a method for controlling a microgrid of a hydrometallurgical plant based on an energy storage frequency converter. The energy storage frequency converter includes an energy storage unit, a first AC-DC converter, and an inverter. An input end of the first AC-DC converter is connected to an external power grid via an AC bus, and a first circuit breaker is provided between the first AC-DC converter and the external power grid. An output end of the first AC-DC converter is connected to an input end of the inverter, and an output end of the inverter is connected to a variable frequency motor. The energy storage unit is connected between the output end of the first AC-DC converter and the input end of the inverter via a branch, the branch is provided with a second circuit breaker. The energy storage unit and renewable energy are both connected to a DC bus. The AC bus and the DC bus are connected via a second branch, and the second branch is provided with a second AC-DC converter.

The method includes:

detecting frequency changes of the AC bus in the plant microgrid to obtain frequency change data; and controlling the opening and closing of the first circuit breaker and the second circuit breaker based on the frequency change data.

According to the method for controlling a microgrid of a hydrometallurgical plant based on an energy storage frequency converter provided by the present disclosure, controlling the opening and closing of the first circuit breaker and the second circuit breaker based on the frequency change data includes:

in a case where the detected frequency change data is within a preset first range, controlling the first circuit breaker to remain on and the second circuit breaker to remain off in a case where the detected frequency change data is within a preset second range, detecting a capacity of the energy storage unit, and controlling the opening and closing of the first circuit breaker and the second circuit breaker based on a detection result, where the degree of frequency change corresponding to the second range is greater than that corresponding to the first range; and in a case where the detected frequency change data is within a preset third range, controlling the first circuit breaker to be off and the second circuit breaker to be on, where the degree of frequency change corresponding to the third range is greater than that corresponding to the second range.

According to the method for controlling a microgrid of a hydrometallurgical plant based on an energy storage frequency converter provided by the present disclosure, controlling the opening and closing of the first circuit breaker and the second circuit breaker based on the detection result includes:

in a case where the detection result shows that the capacity of the energy storage unit meets a power demand to support the variable frequency motor within a preset time, controlling the first circuit breaker to remain on and the second circuit breaker to remain off, and controlling a generator in the plant microgrid to be standby; and in a case where the detection result shows that the capacity of the energy storage unit does not meet the power demand to support the variable frequency motor within the preset time, controlling the opening and closing of the first circuit breaker and the second circuit breaker based on a frequency margin of the generator in the plant microgrid.

According to the method for controlling a microgrid of a hydrometallurgical plant based on an energy storage frequency converter provided by the present disclosure, controlling the opening and closing of the first circuit breaker and the second circuit breaker based on the frequency margin of the generator in the plant microgrid includes:

in a case where the generator in the plant microgrid has a frequency margin that meets power requirements of the variable frequency motor, controlling the first circuit breaker to remain on and the second circuit breaker to remain off;

in a case where the generator in the plant microgrid has a frequency margin that does not meet the power requirements of the variable frequency motor and the energy storage unit has energy storage capacity, controlling the first circuit breaker and the second circuit breaker to remain on so that the generator in the plant microgrid and the energy storage frequency converter cross-synchronously supply power;

in a case where the generator in the plant microgrid does not have a frequency margin and the output of the renewable energy meets operating power requirements of the variable frequency motor in the current period, controlling the first circuit breaker to be off and the second circuit breaker to be on so that the renewable energy supplies power to the variable frequency motor via the energy storage unit; and in a case where the generator in the plant microgrid does not have a frequency margin, the energy storage unit does not have the energy storage capacity, and the output of the renewable energy does not meet the operating power requirements of the variable frequency motor in the current period, controlling the load of other electrical equipment in the plant microgrid or controlling the variable frequency motor to shut down, based on the feasibility of load reduction of other electrical equipment in the plant microgrid.

According to the method for controlling a microgrid of a hydrometallurgical plant based on an energy storage frequency converter provided by the present disclosure, the method further includes:

determining a power supply priority in the plant microgrid based on an electric usage demand of other electrical equipment in the plant microgrid except the variable frequency motor, and controlling a power output variation of the energy storage unit and/or a power output variation of the generator in the plant microgrid based on the power supply priority.

According to the method for controlling a microgrid of a hydrometallurgical plant based on an energy storage frequency converter provided by the present disclosure, the method further includes:

detecting regulation information of the variable frequency motor; and in a case where the regulation information of the variable frequency motor reflects that a regulation frequency of the variable frequency motor is greater than a frequency threshold, controlling both the first circuit breaker and the second circuit breaker to remain on.

The present disclosure also provides a device for controlling a microgrid of a hydrometallurgical plant based on an energy storage frequency converter. The energy storage frequency converter includes an energy storage unit, a first AC-DC converter, and an inverter. An input end of the first AC-DC converter is connected to an external power grid via an AC bus, and a first circuit breaker is provided between the first AC-DC converter and the external power grid. An output end of the first AC-DC converter is connected to an input end of the inverter, and an output end of the inverter is connected to a variable frequency motor. The energy storage unit is connected between the output end of the first AC-DC converter and the input end of the inverter via a branch, the branch is provided with a second circuit breaker. The energy storage unit and renewable energy are both connected to a DC bus. The AC bus and the DC bus are connected via a second branch, and the second branch is provided with a second AC-DC converter.

The device includes:

a data acquisition module, configured to detect frequency changes of the AC bus in the plant microgrid to obtain frequency change data; and a control module, configured to control the opening and closing of the first circuit breaker and the second circuit breaker based on the frequency change data.

The present disclosure also provides an electronic device, including a memory, a processor, and a computer program stored in the memory and runnable on the processor, where the processor, when executing the computer program, implements the method for controlling a microgrid of a hydrometallurgical plant based on an energy storage frequency converter as described in any of the above.

The present disclosure also provides a non-transitory computer-readable storage medium having a computer program stored thereon, which, when executed by a processor, implements the method for controlling a microgrid of a hydrometallurgical plant based on an energy storage frequency converter as described in any of the above.

The present disclosure also provides a computer program product, including a computer program, which, when executed by a processor, implements the method for controlling a microgrid of a hydrometallurgical plant based on an energy storage frequency converter as described in any of the above.

According to the method and device for controlling a microgrid of a hydrometallurgical plant based on an energy storage frequency converter provided by the present disclosure, the energy storage frequency converter includes an energy storage unit, a first AC-DC converter, and an inverter. An input end of the first AC-DC converter is connected to an external power grid via an AC bus, and a first circuit breaker is provided between the first AC-DC converter and the external power grid. An output end of the first AC-DC converter is connected to an input end of the inverter, and an output end of the inverter is connected to a variable frequency motor. The energy storage unit is connected between the output end of the first AC-DC converter and the input end of the inverter via a branch, and the branch is provided with a second circuit breaker. The energy storage unit and renewable energy are both connected to a DC bus. The AC bus and the DC bus are connected via a second branch, and the second branch is provided with a second AC-DC converter. Frequency changes of the AC bus are detected to obtain frequency change data, and the opening and closing of the first circuit breaker and the second circuit breaker are controlled based on the frequency change data. According to the present disclosure, by adding the energy storage frequency converter to the plant power grid and actively monitoring frequency changes of the plant microgrid, the first circuit breaker and the second circuit breaker in the energy storage frequency converter can be opened and closed according to the actual situation of the power grid. In the case of frequency fluctuations or power failures on the AC bus, the energy storage frequency converter is promptly converted to a frequency converter working mode, releasing the stored energy to supply power to the variable frequency motor, thereby improving the stability of production and operation of the frequency conversion equipment in the plant microgrid.

BRIEF DESCRIPTION OF THE DRAWINGS

In order to more clearly illustrate the technical solutions in the present disclosure or the prior art, the following briefly introduces the accompanying drawings required for use in the embodiments or the description of the prior art. Obviously, the accompanying drawings described below are some embodiments of the present disclosure. For those of ordinary skill in this field, other accompanying drawings can be obtained based on these accompanying drawings without paying creative work.

DETAILED DESCRIPTION

Figure 1:
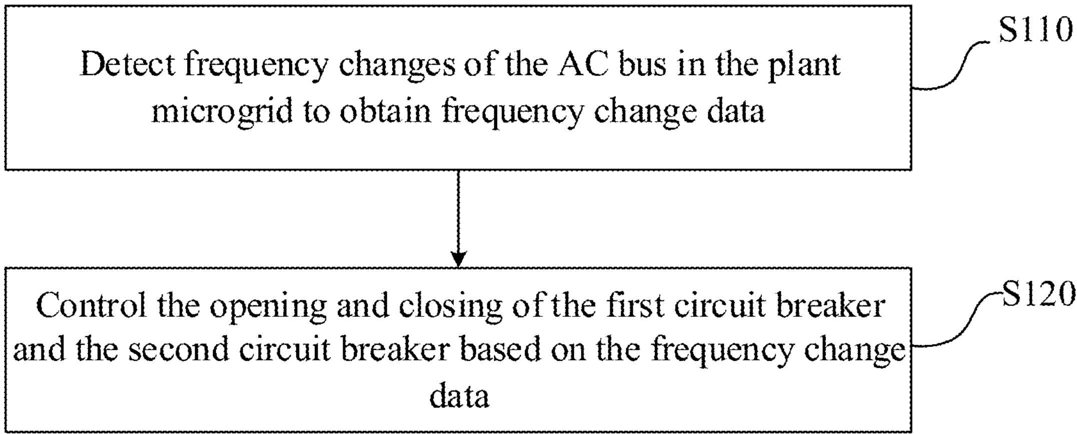
FIG. 1 is a schematic flowchart of a method for controlling a microgrid of a hydrometallurgical plant based on an energy storage frequency converter provided by the present disclosure.

In order to make the purpose, technical solutions and advantages of the present disclosure clearer, the technical solutions of the present disclosure will be clearly and completely described below in conjunction with the accompanying drawings in the present disclosure. Obviously, the described embodiments are part of the embodiments of the present disclosure, rather than all of the embodiments. Based on the embodiments of the present disclosure, all other embodiments obtained by those of ordinary skill in the field without any creative effort shall fall within the scope of protection of the present disclosure.

The method for controlling a microgrid of a hydrometallurgical plant based on an energy storage frequency converter provided by the present disclosure is described as follows in conjunction with FIGS. 1-2. In the method for controlling a microgrid of a hydrometallurgical plant based on an energy storage frequency converter provided by the present disclosure, an energy storage frequency converter and renewable energy (such as photovoltaic and wind power) are connected, and the renewable energy is combined with an energy storage unit to provide power supply for the plant microgrid. The wiring schematic diagram of the energy storage frequency converter in the method for controlling a microgrid of a hydrometallurgical plant based on an energy storage frequency converter provided by the present disclosure is shown in FIG. 2. The energy storage frequency converter includes an energy storage unit, a first AC-DC converter (to realize AC-DC conversion), and an inverter (to realize DC-AC conversion). An input end of the first AC-DC converter is connected to an external power grid (e.g., a park power grid of a park where the plant is located) through an AC bus, and a first circuit breaker is provided between the first AC-DC converter and the external power grid. An output end of the first AC-DC converter is connected to an input end of the inverter, and an output end of the inverter is connected to a variable frequency motor. The energy storage unit is connected between the output end of the first AC-DC converter and the input end of the inverter via a branch, and the branch is provided with a second circuit breaker. The energy storage unit and renewable energy are both connected to a DC bus. The AC bus and the DC bus are connected via a second branch, and the second branch is provided with a second AC-DC converter. The method provided by the present disclosure may be performed by an active detection unit connected to the energy storage frequency converter. The active detection unit is connected to the energy storage frequency converter to form a grid-forming energy storage frequency converter. The active detection unit can detect frequency changes in the plant microgrid in real time, provide monitoring of an operating state of the power grid for the energy storage unit, provide real-time data support for its grid forming, and also determine a switching condition of the energy storage unit. In the event of power limitation on the external power grid of the plant, frequency fluctuations will occur on the rated AC bus in the plant microgrid due to the imbalance between electrical equipment and supply power. At this time, the grid-forming energy storage frequency converter may be directly converted from the conventional working mode to the frequency converter working mode upon the detection by the active detection unit, releasing the stored energy to supply power to the variable frequency motor and reducing the power supply downtime.

Figure 2:
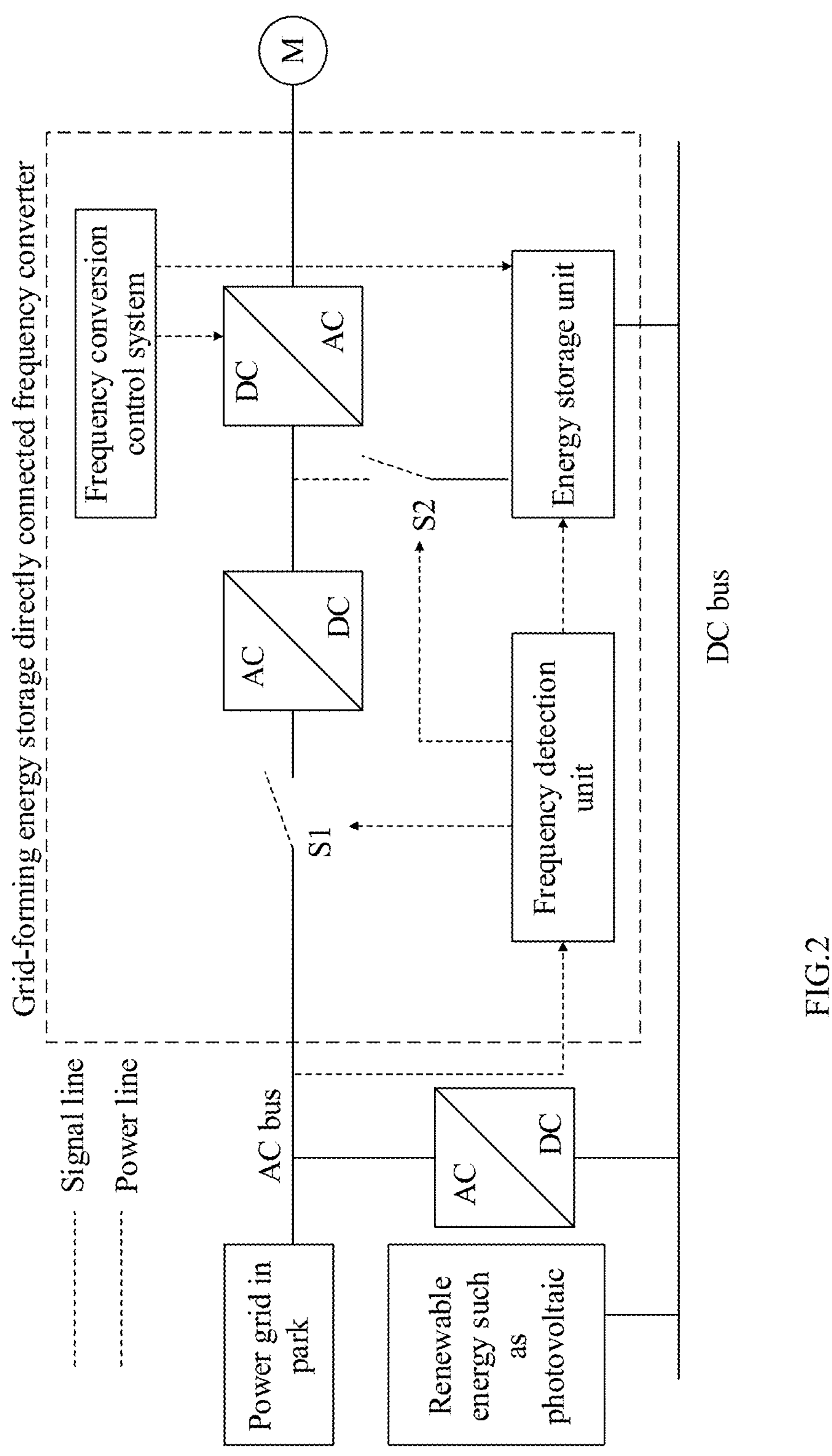
FIG. 2 is a wiring schematic diagram of an energy storage frequency converter in the method for controlling a microgrid of a hydrometallurgical plant based on an energy storage frequency converter provided by the present disclosure.

As shown in FIG. 1, the method for controlling a microgrid of a hydrometallurgical plant based on an energy storage frequency converter provided by the present disclosure includes steps:

- S110, detecting frequency changes of the AC bus in the plant microgrid to obtain frequency change data; and
- S120, controlling the opening and closing of the first circuit breaker and the second circuit breaker based on the frequency change data.

By means of the method provided by the present disclosure, control instructions applicable to different conditions are provided for the energy storage frequency converter according to different power supply architectures and working modes that may exist in the plant microgrid, thereby improving the working capacity and applicability of the energy storage frequency converter. Specifically, controlling the opening and closing of the first circuit breaker and the second circuit breaker based on the frequency change data includes:

- in a case where the detected frequency change data is within a preset first range, controlling the first circuit breaker to remain on and the second circuit breaker to remain off;
- in a case where the detected frequency change data is within a preset second range, detecting a capacity of the energy storage unit, and controlling the opening and closing of the first circuit breaker and the second circuit breaker based on a detection result, where the degree of frequency change corresponding to the second range is greater than that corresponding to the first range; and
- in a case where the detected frequency change data is within a preset third range, controlling the first circuit breaker to be off and the second circuit breaker to be on, where the degree of frequency change corresponding to the third range is greater than that corresponding to the second range.

In the method provided by the present disclosure, different frequency change nodes are used as constraint conditions for controlling the working state of the energy storage frequency converter. The frequency change nodes can be represented by three ranges. A first range, a second range and a third range can be set based on actual conditions of the power grid. In a possible implementation, the first range can be between ±0.2 Hz, the second range can be between ±0.2-0.5 Hz, and the third range can be beyond ±0.5 Hz.

In a case where the frequency change data is within the preset first range, the first circuit breaker is turned on and the second circuit breaker is opened. At this time, the energy storage unit of the energy storage frequency converter relies on the DC bus for charging or standby operation, and the energy storage capacity of the energy storage unit is controlled to be above 50% of the total capacity as much as possible.

In a case where the frequency change data is within the preset third range, it indicates that there is a power system failure in the plant microgrid, and the voltage and frequency of the external power grid may not meet subsequent operating requirements of the variable frequency motor. At this time, the first circuit breaker should be opened quickly, the second circuit breaker should be turned on, and the energy storage unit should supply power to the inverter and the frequency conversion equipment. Meanwhile, current real-time grid-forming power data of the variable frequency motor is read in a frequency conversion control system, and the power output of the energy storage unit is controlled to realize functional transition of the variable frequency motor with as little fluctuation and delay time as possible.

In a case where the frequency change data is within the preset second range, the power of the variable frequency motor is detected by a power detection signal of the variable frequency motor in the frequency conversion control system, and the capacity in the energy storage unit is checked by the control system that comes with the energy storage unit. The controlling the opening and closing of the first circuit breaker and the second circuit breaker according to the capacity detection result specifically includes:

controlling the first circuit breaker to keep on and the second circuit breaker to keep off, and controlling a generator in the plant microgrid to be standby; and in a case where the detection result shows that the capacity of the energy storage unit does not meet the power demand to support the variable frequency motor within the preset time, controlling the opening and closing of the first circuit breaker and the second circuit breaker based on a frequency margin of the generator in the plant microgrid.

The preset time is a shorter period of time, such as 3-5 minutes. In a case where the frequency change data is within the second range, it is necessary to prepare for the situation where the frequency data of the AC bus continues to fluctuate and the frequency change data is within the third range. First, the first circuit breaker remains on and the second circuit breaker remains off, and a suitable number of generators are prepared based on operating parameters of a self-contained power generation system (including at least one generator) of the current plant. Since the energy storage frequency converter has a characteristic of short delay time, the generator can be quickly put into use in a case where the external power grid cannot directly supply power, ensuring the normal operation of the variable frequency motor. Having the characteristic of short delay time, the energy storage frequency converter is particularly applicable to instantaneous support of a frequency conversion unit in a case where the frequency of the plant microgrid drops due to a power supply interruption from the external power grid. Therefore, in a case where the frequency change data is within the second range, the output of the renewable energy should also be adjusted, giving the priority to power supply of the energy storage unit, ensuring that the energy storage frequency converter contains at least energy reserve that can be supplied to the variable frequency motor for the preset time, thereby providing a necessary intermediate transition for subsequent startup of the generator in a self-generating system of the plant.

If it is detected that the capacity of the energy storage unit does not meet the power demand to support the variable frequency motor within the preset time, that is, short-term stable power support cannot be provided for the variable frequency motor, there will be a plurality of working conditions based on the frequency margin of the generator in the plant microgrid, which will be explained below, respectively.

The controlling the opening and closing of the first circuit breaker and the second circuit breaker based on the frequency margin of the generator in the plant microgrid includes:

in a case where the generator in the plant microgrid has a frequency margin that meets power requirements of the variable frequency motor, controlling the first circuit breaker to remain on and the second circuit breaker to remain off;

in a case where the generator in the plant microgrid has a frequency margin that does not meet the power requirements of the variable frequency motor and the energy storage unit has energy storage capacity, controlling the first circuit breaker and the second circuit breaker to remain on so that the generator in the plant microgrid and the energy storage frequency converter cross-synchronously supply power; and in a case where the generator in the plant microgrid does not have a frequency margin and the output of the renewable energy meets operating power requirements of the variable frequency motor in the current period, controlling the first circuit breaker to be off and the second circuit breaker to be on so that the renewable energy supplies power to the variable frequency motor via the energy storage unit.

The first working condition is that the self-contained generator of the plant has been prepared or the existing generator put into use still has a certain generation power margin, the power can be directly increased to be supplied to the variable frequency motor, and the generation power margin meets the power requirements of the variable frequency motor, in which case the first circuit breaker can be controlled to remain on and the second circuit breaker to remain off. When the power is off, the first circuit breaker also remains on and the second circuit breaker remains off, and the generator directly increases the power to be supplied the variable frequency motor.

The second working condition is that the self-contained generator of the plant has been prepared or the existing generator put into use still has a certain generation power margin, the power requirements of the variable frequency motor under this working condition cannot be fully met, and the energy storage unit still has some energy storage capacity, in which case the first circuit breaker and the second circuit breaker can be turned on at the same time to realize cross-synchronous power supply of the generator and the energy storage frequency converter. However, the balance between the generator and energy storage output should be strictly controlled at this time to ensure voltage balance.

The third working condition is that the self-contained generator of the plant has not been prepared or the existing generator put into use has no generation power margin, and the processing of the renewable energy is capable of meeting the operating power requirements of the variable frequency motor during this period, in which case the first circuit breaker can be quickly controlled to be off and the second circuit breaker to be on, and the energy storage unit outputs the power of the renewable energy to the variable frequency motor via the second circuit breaker.

The fourth working condition is that the self-contained generator of the plant has not been prepared or the existing generator put into use has no generation power margin, the energy storage unit does not have any energy storage capacity, and the renewable energy cannot provide a stable and reliable energy supply (for example, there is no photovoltaic power generation at night or on rainy days, and the output of wind power generation is 0 or the power fluctuates greatly), in which case it should be determined whether other electrical equipment in the plant can operate at a reduced load; if so, the power of other electrical equipment in the plant should be appropriately reduced to provide a basic power supply guarantee for the variable frequency motor; if not, the variable frequency motor should be controlled to shut down.

Under the above first, second and third working conditions, in the event of frequency fluctuations on the self-contained generator of the plant, the power output of the energy storage unit should be adjusted in time.

It can be seen that, in the method provided by the present disclosure, the frequency output and frequency conditions of power sources such as an external power grid or a self-contained generator of the plant are detected, and characteristic data of the plant microgrid are provided to the energy storage frequency converter in real time according to the operating state of the power system in the plant microgrid, providing a data support for the energy storage frequency converter to supply power to the selected plant. Further, the output is regulated according to the scheduling and the energy margin in the energy storage unit, so that the working state of the variable frequency motor can meet the requirements of the production link at that time as much as possible.

The energy storage frequency converter in the method provided by the present disclosure is configured for the variable frequency motor. Other electrical equipment in the plant is connected to the DC or AC bus. Although other electrical equipment in the plant is not connected to the energy storage frequency converter, the electric usage demand of other electrical equipment in the plant will affect power distribution of the external power grid and the generator, resulting in affecting the variable frequency motor. Taking into account the electric usage demand of other electrical equipment in the plant during actual operation, the situations in which the power supplied to other electrical equipment in the plant can be provided to the variable frequency motor are different. Based on this, in the method provided by the present disclosure, a power supply priority in the plant microgrid is also determined based on the electric usage demand of other electrical equipment in the plant microgrid except the variable frequency motor, and a power output variation of the energy storage unit and/or a power output variation of the generator in the plant microgrid is controlled based on the power supply priority.

Specifically, in a case where an adjustable margin of other electrical equipment in the plant is less than a first preset threshold, that is, the adjustable margin is relatively small, the variable frequency motor and other electrical equipment should be controlled to be operated with the strategy of a first priority in the plant microgrid in order to ensure the normal operation of the variable frequency motor and other electrical equipment. The first priority corresponds to prior energy storage supply, so that the generator in the plant microgrid may be mainly used to ensure the operation of other electrical equipment. At this time, a control instruction for the power output variation of the energy storage unit is shown as the following equation:

$$\Delta P_{st-en} = -(\Delta P_{di-ge} - \Delta P_{va-f-m})\frac{sT}{1+sT};$$

where $\Delta P_{st-en}$ represents the power output variation of the energy storage unit, $\Delta P_{di-ge}$ represents the power output variation of the generator, in kW, $\Delta P_{va-f-m}$ represents the actual power variation of the variable frequency motor, in kW, S represents an Laplace operator, and T represents a time constant of a saturation filter.

In a case where an adjustable margin of other electrical equipment in the plant is greater than a second preset threshold, that is, the adjustable margin is relatively large, and the battery capacity of the energy storage unit is insufficient, the variable frequency motor and other electric equipment should be operated with the strategy of a second priority under the condition of ensuring the normal operation of the variable frequency motor and other electrical equipment. The second priority corresponds to prior generator supply. At this time, a control instruction for the power output variation of the generator is detailed in the following equation:

$$\Delta P_{di-ge} = -(\Delta P_{st-en} - \Delta P_{va-f-m})\frac{1}{1+sT}.$$

In a case where an adjustable threshold of other electrical equipment in the plant is greater than the first preset threshold and less than the second preset threshold, that is, the adjustable margin is moderate, the battery of the energy storage unit has a certain capacity, and the renewable energy has a relatively stable working output, the renewable energy can be connected synchronously. The variable frequency motor and other electrical equipment are operated with the strategy of a third priority under the condition of ensuring the normal operation of the variable frequency motor and other electrical equipment. The third priority corresponds to the same priority of energy storage supply and generator supply. At this time, control instructions for the energy storage unit and the power output variation of the generator are detailed in the following equations:

$$\Delta P_{st-en} = -(\Delta P_{re} - \Delta P_{va-f-m})\frac{sT}{1+sT};$$

$$\Delta P_{di-ge} = -(\Delta P_{re} - \Delta P_{va-f-m})\frac{1}{1+sT};$$

$$P_{st-en} + P_{di-ge} + P_{re} = P_{va-f-m};$$

where $\Delta P_{re}$ represents the power output variation of the power generation system for the renewable energy, in kW, $P_{st-en}$ represents the calculated actual supply power of the energy storage unit, in kW, $P_{di-ge}$ represents the calculated actual supply power of the generator, in kW, and $P_{re}$ represents the actual supply power of the power generation system for the renewable energy, in kW.

The variable frequency motor in the method provided by the present disclosure may be a variable frequency motor of large equipment such as a ball mill. The operating state of the variable frequency motor of such equipment usually is not frequently regulated. It can be seen from the previous description that, in the method provided by the present disclosure, the frequency output of each power supply source in the microgrid can be controlled according to the operating states of the external power grid, the self-contained generator of the plant, and the variable frequency motor in under soft startup or variable-frequency running of the variable frequency motor (a motor of equipment such as a ball mill), so as to ensure the stable operation of the variable frequency motor. Further, the variable frequency motor in the method provided by the present disclosure may be a motor of frequently-regulated equipment (such as a semi-automatic device). Through the method provided by the present disclosure, the power disturbance brought to the power grid caused by frequent regulation of the variable frequency motor connected to the power grid can also be reduced. Specifically, regulation information of the variable frequency motor is detected during the routine operation of the plant microgrid; and in a case where the regulation information of the variable frequency motor reflects that a regulation frequency of the variable frequency motor is greater than a frequency threshold, both the first circuit breaker and the second circuit breaker are controlled to remain on. In this way, frequent regulation of the variable frequency motor can be functioned (similar to the cross-function in the second working condition mentioned above) in fine detail by relaying upon energy storage, with no need of controlling the power grid other than the energy storage frequency converter to participate in the regulation, thereby improving the stability of the power grid in a case where the variable frequency motor in the plant microgrid is frequently regulated.

Figure 3:
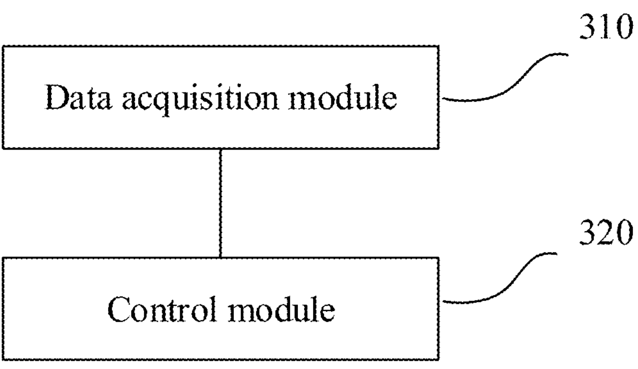
FIG. 3 is a schematic structural diagram of a device for controlling a microgrid of a hydrometallurgical plant based on an energy storage frequency converter provided by the present disclosure.

The device for controlling a microgrid of a hydrometallurgical plant based on an energy storage frequency converter provided by the present disclosure is described below. The device for controlling a microgrid of a hydrometallurgical plant based on an energy storage frequency converter described below and the method for controlling a microgrid of a hydrometallurgical plant based on an energy storage frequency converter described above can be referred to each other. As shown in FIG. 3, the device for controlling a microgrid of a hydrometallurgical plant based on an energy storage frequency converter provided by the present disclosure includes the following modules:

a data acquisition module 310, configured to detect frequency changes of the AC bus in the plant microgrid to obtain frequency change data; and a control module 320, configured to control the opening and closing of the first circuit breaker and the second circuit breaker based on the frequency change data.

Figure 4:
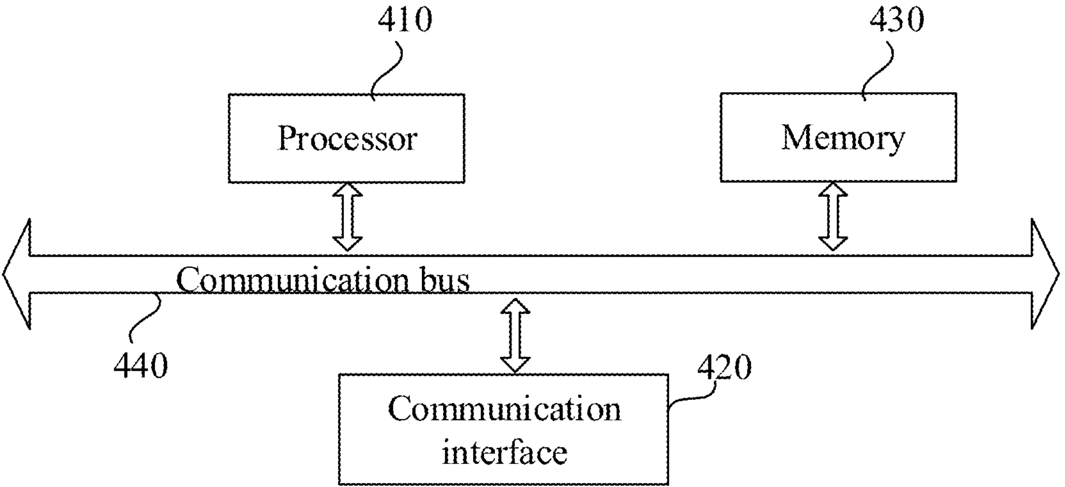
FIG. 4 is a schematic structural diagram of an electronic device provided by the present disclosure.

FIG. 4 illustrates a schematic diagram of a physical structure of an electronic device. As shown in FIG. 4, the electronic device may include: a processor 410, a communication interface 420, a memory 430, and a communication bus 440, where the processor 410, the communication interface 420 and the memory 430 communicate with each other via the communication bus 440. The processor 410 may call logic instructions in the memory 430 to execute the method for controlling a microgrid of a hydrometallurgical plant based on an energy storage frequency converter. The method includes: detecting frequency changes of the AC bus in the plant microgrid to obtain frequency change data; and controlling the opening and closing of the first circuit breaker and the second circuit breaker based on the frequency change data.

In addition, the logic instructions in the above memory 430 may be implemented in the form of software functional units and when sold or used as independent products, may be stored in a computer-readable storage medium. Based on such understanding, the technical solutions of the present disclosure essentially, or the part that contributes to the prior art, or the part of the technical solution can be embodied in the form of a software product. The computer software product is stored in a storage medium and includes a number of instructions for enabling a computer device (which may be a personal computer, a server, or a network device, etc.) to perform all or part of the steps of the method described in each embodiment of the present disclosure. The aforementioned storage media include: USB flash drives, mobile hard disks, read-only memories (ROMs), random access memories (RAMs), magnetic disks or optical disks, and other media that can store program codes.

On the other hand, the present disclosure also provides a computer program product including a computer program, which can be stored on a non-transitory computer-readable storage medium. When the computer program is executed by a processor, the computer can execute the method for controlling a microgrid of a hydrometallurgical plant based on an energy storage frequency converter provided by the above methods. The method includes: detecting frequency changes of the AC bus in the plant microgrid to obtain frequency change data; and controlling the opening and closing of the first circuit breaker and the second circuit breaker based on the frequency change data.

On the other hand, the present disclosure also provides a non-transitory computer-readable storage medium having a computer program stored thereon, which, when executed by a processor, is implemented to execute the method for controlling a microgrid of a hydrometallurgical plant based on an energy storage frequency converter provided by the above methods. The method includes: detecting frequency changes of the AC bus in the plant microgrid to obtain frequency change data; and controlling the opening and closing of the first circuit breaker and the second circuit breaker based on the frequency change data.

The device embodiments described above are merely illustrative, in which the units described as separate components may or may not be physically separated, and the components displayed as units may or may not be physical units, that is, they may be located in one place or distributed over a plurality of network units. Some or all of the modules may be selected according to actual needs to achieve the purpose of the solution in this embodiment. Those of ordinary skill in the art can understand and implement the present disclosure without any creative effort.

Through the description of the above implementations, those skilled in the art can clearly understand that each implementation can be implemented by means of software plus a necessary general hardware platform, and can also be implemented by hardware certainly. Based on this understanding, the above technical solutions essentially or the part that contributes to the prior art can be embodied in the form of a software product. The computer software product can be stored in a computer-readable storage medium, such as ROM/RAM, a disk, and an optical disk, and includes a number of instructions for enabling a computer device (which can be a personal computer, a server, or a network device, etc.) to execute the methods described in each embodiment or certain parts of the embodiments.

Finally, it should be noted that the above embodiments are merely used to illustrate, rather than limiting, the technical solutions of the present disclosure. Although the present disclosure has been described in detail with reference to the aforementioned embodiments, those of ordinary skill in the art should understand that they can still modify the technical solutions described in the aforementioned embodiments, or make equivalent replacements for part of the technical features therein; and these modifications or replacements do not deviate the essence of the corresponding technical solutions from the spirit and scope of the technical solutions of the embodiments of the present disclosure.

What is claimed is:

1. A method for controlling a microgrid of a hydrometallurgical plant based on an energy storage frequency converter, wherein the energy storage frequency converter comprises an energy storage unit, a first alternating current to direct current (AC-DC) converter, and an inverter, wherein an input end of the first AC-DC converter is connected to an external power grid via an alternating current (AC) bus, a first circuit breaker is provided between the first AC-DC converter and the external power grid, an output end of the first AC-DC converter is connected to an input end of the inverter, an output end of the inverter is connected to a variable frequency motor, the energy storage unit is connected between the output end of the first AC-DC converter and the input end of the inverter via a branch, the branch is provided with a second circuit breaker, the energy storage unit and renewable energy are both connected to a direct current (DC) bus, the AC bus and the DC bus are connected via a second branch, and the second branch is provided with a second AC-DC converter;

the method comprises:

detecting frequency changes of the AC bus in the plant microgrid to obtain frequency change data; and controlling the opening and closing of the first circuit breaker and the second circuit breaker based on the frequency change data.

2. The method according to claim 1, wherein controlling the opening and closing of the first circuit breaker and the second circuit breaker based on the frequency change data comprises:

in a case where the detected frequency change data is within a preset first range, controlling the first circuit breaker to remain on and the second circuit breaker to remain off;

in a case where the detected frequency change data is within a preset second range, detecting the capacity of the energy storage unit, and controlling the opening and closing of the first circuit breaker and the second circuit breaker based on a detection result, wherein the degree of frequency change corresponding to the second range is greater than that corresponding to the first range; and in a case where the detected frequency change data is within a preset third range, controlling the first circuit breaker to be off and the second circuit breaker to be on, wherein the degree of frequency change corresponding to the third range is greater than that corresponding to the second range.

3. The method according to claim 2, wherein controlling the opening and closing of the first circuit breaker and the second circuit breaker based on the detection result comprises:

in a case where the detection result shows that the capacity of the energy storage unit meets a power demand to support the variable frequency motor within a preset time, controlling the first circuit breaker to remain on and the second circuit breaker to remain off, and controlling a generator in the plant microgrid to be standby; and in a case where the detection result shows that the capacity of the energy storage unit does not meet the power demand to support the variable frequency motor within the preset time, controlling the opening and closing of the first circuit breaker and the second circuit breaker based on a frequency margin of the generator in the plant microgrid.

4. The method according to claim 3, wherein controlling the opening and closing of the first circuit breaker and the second circuit breaker based on the frequency margin of the generator in the plant microgrid comprises:

in a case where the generator in the plant microgrid has a frequency margin that meets power requirements of the variable frequency motor, controlling the first circuit breaker to remain on and the second circuit breaker to remain off;

in a case where the generator in the plant microgrid has a frequency margin that does not meet the power requirements of the variable frequency motor and the energy storage unit has energy storage capacity, controlling the first circuit breaker and the second circuit breaker to remain on so that the generator in the plant microgrid and the energy storage frequency converter cross-synchronously supply power;

in a case where the generator in the plant microgrid does not have a frequency margin and the output of the renewable energy meets operating power requirements of the variable frequency motor in the current period, controlling the first circuit breaker to be off and the second circuit breaker to be on so that the renewable energy supplies power to the variable frequency motor via the energy storage unit; and in a case where the generator in the plant microgrid does not have a frequency margin, the energy storage unit does not have the energy storage capacity, and the output of the renewable energy does not meet the operating power requirements of the variable frequency motor in the current period, controlling the load of other electrical equipment in the plant microgrid or controlling the variable frequency motor to shut down, based on the feasibility of load reduction of other electrical equipment in the plant microgrid.

5. The method according to claim 4, wherein the method further comprises:

determining a power supply priority in the plant microgrid based on an electric usage demand of other electrical equipment in the plant microgrid except the variable frequency motor, and controlling a power output variation of the energy storage unit and/or a power output variation of the generator in the plant microgrid based on the power supply priority.

6. The method according to claim 1, wherein the method further comprises:

detecting regulation information of the variable frequency motor; and in a case where the regulation information of the variable frequency motor reflects that a regulation frequency of the variable frequency motor is greater than a frequency threshold, controlling both the first circuit breaker and the second circuit breaker to remain on.

7. An electronic device, comprising a memory, a processor, and a computer program stored in the memory and runnable on the processor, wherein the processor, when executing the computer program, implements the method according to claim 1.

8. A non-transitory computer-readable storage medium having a computer program stored thereon, wherein the computer program, when executed by a processor, implements the method according to claim 1.

9. A device for controlling a microgrid of a hydrometallurgical plant based on an energy storage frequency converter, applicable to an energy storage frequency converter in a plant microgrid, wherein the energy storage frequency converter comprises an energy storage unit, a first alternating current to direct current (AC-DC) converter, and an inverter, wherein an input end of the first AC-DC converter is connected to an external power grid via an alternating current (AC) bus, a first circuit breaker is provided between the first AC-DC converter and the external power grid, an output end of the first AC-DC converter is connected to an input end of the inverter, an output end of the inverter is connected to a variable frequency motor, the energy storage unit is connected between the output end of the first AC-DC converter and the input end of the inverter via a branch, the branch is provided with a second circuit breaker, the energy storage unit and renewable energy are both connected to a direct current (DC) bus, the AC bus and the DC bus are connected via a second branch, and the second branch is provided with a second AC-DC converter;

the device comprises:

a data acquisition module, configured to detect frequency changes of the AC bus in the plant microgrid to obtain frequency change data; and a control module, configured to control the opening and closing of the first circuit breaker and the second circuit breaker based on the frequency change data.

* * * * *